Figure 1:
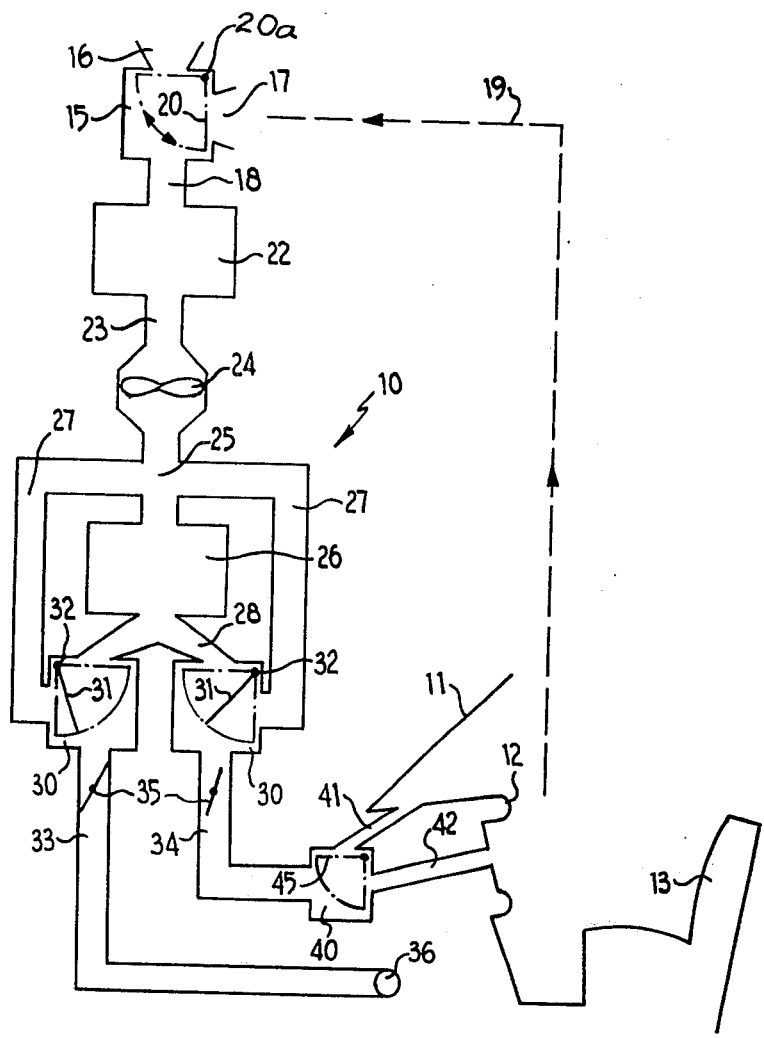

United States Patent [19]
Coulson et al.

[11] 3,934,642
[45] Jan. 27, 1976

[54] VEHICLE AIR CONDITIONING SYSTEM
[75] Inventors: Derrick Coulson, Crewe; John C. Coyle, Wybunbury, Near Mantwick, both of England
[73] Assignee: Rolls-Royce Motors Limited, Crewe, England
[22] Filed: Apr. 8, 1974
[21] Appl. No.: 459,234

[30] Foreign Application Priority Data
Apr. 13, 1973 United Kingdom............... 17858/73

[52] U.S. Cl. ..................... 165/23; 165/29; 165/41; 165/42; 165/43; 165/44
[51] Int. Cl.² .......................................... B60H 3/04
[58] Field of Search..................... 165/23, 29, 41–44

[56] References Cited
UNITED STATES PATENTS
3,315,730    4/1967    Weaver et al......................... 165/23

*Primary Examiner*—Charles J. Myhre
*Assistant Examiner*—William Anderson
*Attorney, Agent, or Firm*—Cushman, Darby & Cushman

[57] ABSTRACT

A vehicle air conditioning system comprises an intake, refrigerant evaporator, heater, heat by-pass conduit temperature and air flow regulating means and ducting leading to the vehicle interior. Control means operate to maintain the air conditioning system de-energised engine start up until the vehicle engine oil pressure reaches a certain value and the engine starter motor is de-energised.

9 Claims, 3 Drawing Figures

VEHICLE AIR CONDITIONING SYSTEM

The present invention relates to air conditioning systems for vehicles which have internal combustion engines.

In British Pat. No. 1,278,202 there is described and claimed a vehicle air conditioning system comprising an air intake, a refrigerant evaporator, a heater and a heater by-pass conduit, first and second outlet ducting for separately conveying air to respective outlets in the upper and lower parts of the vehicle interior respectively, first and second air-mixing means associated with said first and second outlet ducting repectively and each of which is automatically settable to feed to the said respective outlet ducting air which has passed through the evaporator and through the heater and/or the heater by-pass conduit, settable mass flow regulating means in each said outlet ducting, air temperature sensing means adapted to measure the air temperature in both outlet ductings, the ambient temperature, and the temperature inside the vehicle, and adapted automatically to control the air-mixing means and the mass flow regulating means, means for closing the outlet or outlets of the second outlet ducting and diverting the entire output of the system to the first outlet ducting, and a manual device for varying the setting of the said sensing means.

With the above described system, when the ignition of the vehicle is switched on but before the engine is started, some whirring and commotion may be heard. This may be disturbing to the non mechanically minded driver and irritating to the mechanically minded driver and it is an object of this invention to overcome this problem.

According to the present invention, there is provided a vehicle air conditioning system for an internal combustion engine driven vehicle comprising an air intake, a refrigerant evaporator, a heater and a heater by-pass conduit, first and second outlet ducting for separately conveying air to respective outlets in the upper and lower parts of the vehicle interior respectively, first and second air-mixing means associated with said first and second outlet ducting respectively and each of which is automatically settable to feed to the said respective outlet ducting air which has passed through the evaporator and through the heater and/or the heater by-pass conduit settable mass flow regulating means in at least one outlet ducting, air temperature sensing means adapted to measure and ambient temperature, the temperature inside the vehicle and adapted automatically to control the air-mixing means and the mass flow regulating means, means for closing the outlet or outlets of the second outlet ducting and diverting the entire output of the system to the first outlet ducting, a manual device for varying the setting of the said sensing means, and control means, responsive to engine oil pressure and the energisation state of the engine starter motor circuit, operative to maintain the air conditioning system de-energised until the oil pressure reaches a predetermined value and the starter motor circuit is again de-energised after engine start up. the above defined air conditioning system with electrically operable fans between the outlet of the evaporator and the inlets of the heater and heater by-pass conduit and fan control means operative to control fan speed in dependence upon the additive requirements of the air in the first and second outlet ductings.

It is a further object of the invention to arrange the above defined air conditioning system such that the means for shutting off the second outlet ducting assumes a closed position until the fan is switched on under predetermined conditions at engine start up.

It is a still further object of the invention to provide the above defined air conditioning system with a flashmist delay circuit which is operative to inhibit operation of the fan when humid air is present in the outlet ducting.

The scope of the invention also includes a vehicle, e.g. a motor car, provided with an air conditioning system as set forth above.

Figure 2:
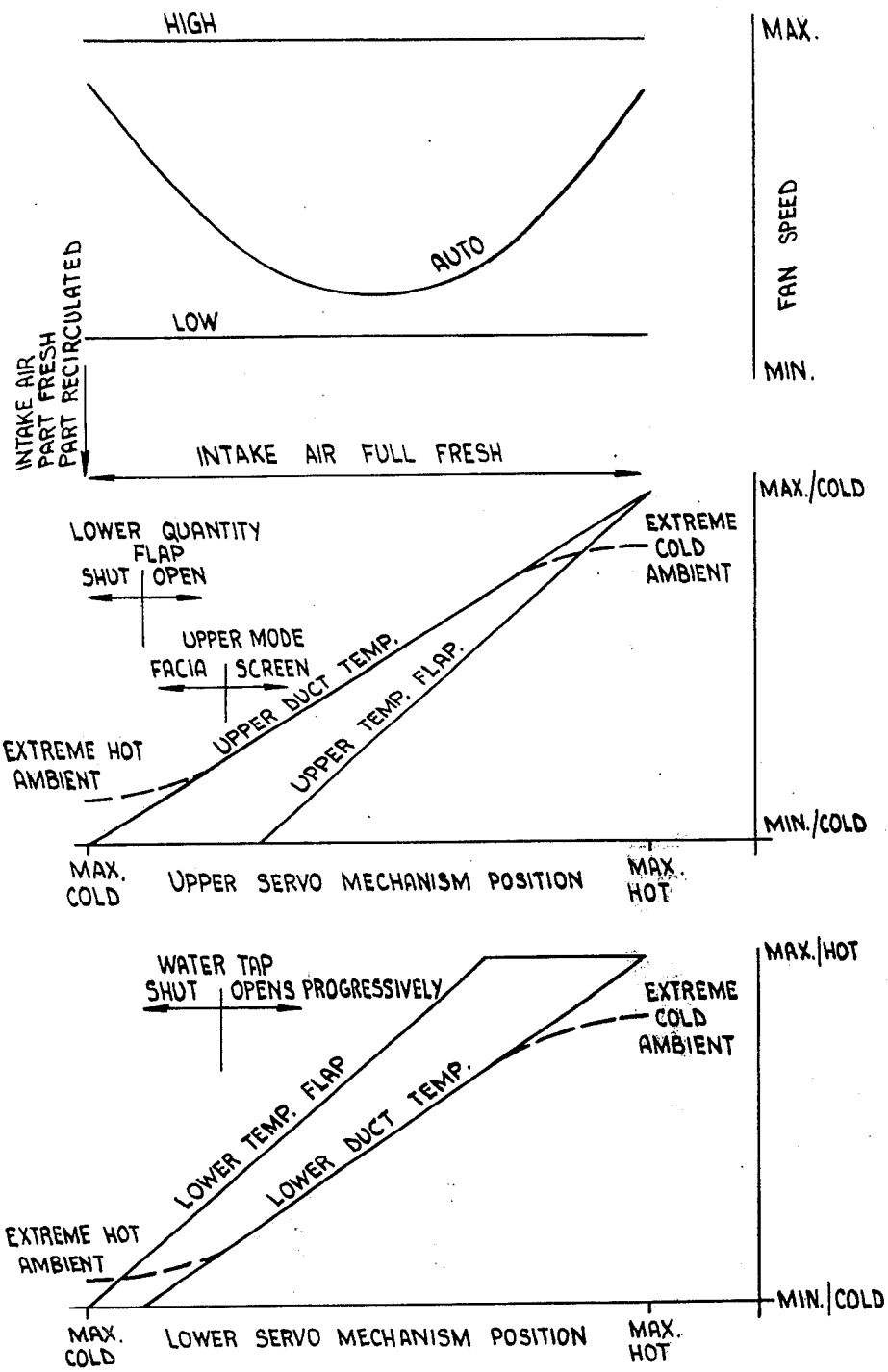
Figure 3:
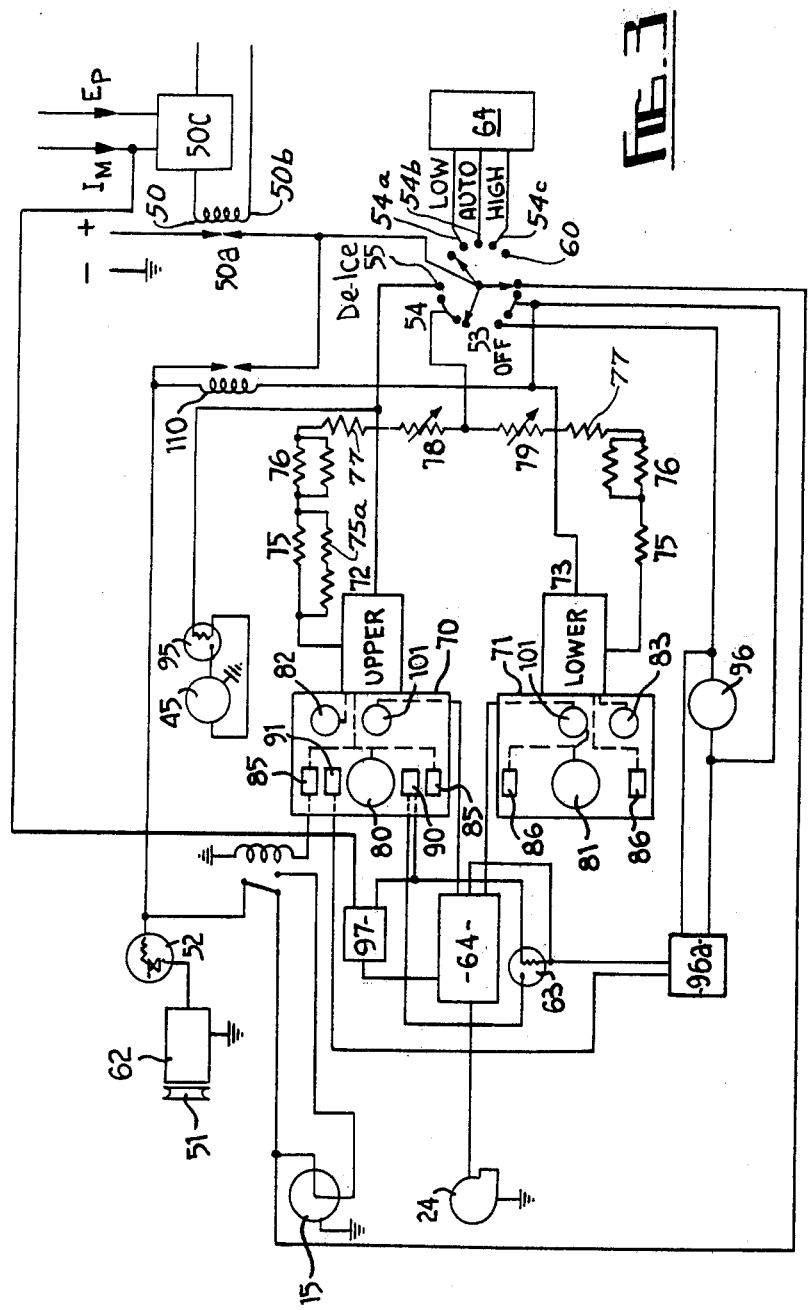

In order that the invention may be more clearly understood, one embodiment of the invention will now be described, by way of example, with reference to the accompanying drawings, in which:

FIG. 1 is a schematic view of a motor car air conditioning system in accordance with the present invention, FIG. 2 is a graphical representation of the relationship between various parameters of the system shown in FIG. 1, and FIG. 3 is a block diagram of the controls of the system shown in FIG. 1.

Referring to FIG. 1 there is shown a motor car air conditioning system generally indicated by the reference numeral 10. The motor car itself is not shown, although purely diagrammatically there is shown a windscreen 11, a faciaboard 12 and a front seat 13.

The air conditioning system is located in the motor car and includes an air intake chamber 15 which is provided with two inlets 16 and 17 and an outlet 18. The inlet 16 is arranged to receive fresh air, while the inlet 17 is arranged to receive air which has been recirculated from the interior of the motor car, the route of which is shown by the dotted line 19. In the intake chamber 15 is pivotally mounted a valve in the form of a flap 20, hereinafter referred to as the "fresh/recirculation air flap", which is capable of pivotally moving from its full-line position shown in FIG. 1 to its dotted-line position along a path which is also indicated in dotted lines and is controlled by a recirculation actuator 20a. As will be seen, in its full-line position the fresh air inlet 16 is fully open while the recirculation inlet 17 is fully closed. While in its dotted-line position this situation is exactly reversed. Of course, the flap 20 is capable of assuming any position intermediate these two extremes, that is to say it is capable of assuming positions in which both fresh and recirculated air are admitted to the intake chamber 15.

When the system uses only two positions, full fresh or part recirculated part fresh, the selector switch is at LOW, HIGH or AUTO. The actuator is at full fresh for all servo positions except when the Upper Servo moves to maximum cold. A maximum cold signal is available from the cold limit switch 85 inside the Upper Servo. This limit switch operates a new recirculation relay. The relay is fitted with changeover contacts which are used to switch the recirculation actuator directly. The recirculation actuator is also controlled by the A.C.U. selector switch such that is moves to full recirculation when the system is switched OFF.

Air from the intake chamber 15 passes via the outlet 18 to a refrigerant evaporator matrix or core 22. The evaporator 22 is arranged to cool the incoming air for all ambient temperatures above freezing point. In cooling the air, an uncontrolled proportion of moisture is extracted from the air and the amount of moisture so extracted will be dependent only upon the prevailing climatic conditions and the mass flow of the air. Some degree of air purification will take place as a result of the dehumidification process.

Air from the evaporator 22 passes via a conduit 23 to a continuously variable speed fan 24 from which the air is delivered to a junction 25. Note that the relative positions of the evaporator 22 and fan 24 may be reversed. The junction 25 is connected for flow communication to a heater 26 and to two cold air by-pass conduits 27 which respectively by-pass the heater 26. The heater 26 is in the form of a heat exchanger through which a hot liquid passes and in the preferred embodiment, in which the motor car is provided with a liquid-cooled engine, the hot liquid is coolant, usually water with additives, which has passed through the engine block of the motor car.

The heater 26 is provided with two outlet conduits 28 which communicate with respective air mixing chambers 30 each of which communicates also with one of the cold air by-pass conduits 27. Each air mixing chamber 30 is moreover provided with a valve device 31 of the pivotable flap type, which will hereinafter be referred to as a "temperature flap". Each temperature flap 31 is mounted on a respective pivot 32 to be pivotally settable at any position between the two extremes shown in broken lines in which, respectively, each air mixing chamber 30 receives only heated air from the conduits 28 or only cold air from the conduits 27. In the illustrated full-line position of the temperature flaps 31, however, the mixing chambers 30 receive both heated air and cold by-pass air. Thus the temperature flaps 31 act as a means of proportioning hot and cold air.

The air mixing chambers 30 are provided with respective outlet ducts or ducting 34, 33 which are completely separated from each other and which respectively communicate with outlets to the upper and lower parts of the motor vehicle interior. The combination of outlet ducts 33, 34 with their respective air mixing chambers 30 will be referred to as "lower" and "upper" systems. The outlet duct 33 is provided with a centrally pivoted valve device 35 which will hereinafter be referred to as a "quantity flap" since it regulates the mass flow in the outlet duct 33. If desired, a similar quantity flap may be centrally pivotally mounted in the other outlet duct 34. Where there are two quantity flaps 35 they are pivotable independently of each other, while each quantity flap is interlinked with a corresponding temperature flap 31.

The combination of the temperature flaps 31 and the quantity flap 35, and the fan speed, enables the system to provide the optimum mass flow of air at the desired temperature in each of the separate systems, namely the upper and lower systems, notwithstanding the fact that there is a single common fan 24.

The outlet duct 33 communicates with lower outlet distribution ducting 36 communicating with the lower part of the interior of the motor car, while the outlet duct 34 communicates with a further chamber 40. The chamber 40 has two spaced apart outlet ducts 41 and 42 which are respectively adapted to convey air to an outlet adjacent the windscreen 11 and to an outlet or outlets in the facia 12. In the chamber 40 is pivotally mounted a valve 45 which will hereinafter be referred to as the "upper mode flap". The upper mode flap 45 is continuously settable between the two extreme positions shown respectively in full and dotted lines in FIG. 1, and thus it will be seen that the upper mode flap 45 acts to proportion the respective amounts of air passing to the windscreen and/or to the facia vents.

The upper mode flap 45 makes it possible to provide in this preferred embodiment of the present invention for either heating the windscreen and the upper portion of the motor car interior via the windscreen duct 41 only, or providing cooling or a mild degree of heating of the upper portion of the motor car interior via the facia duct 42. This permits the selection of very high air temperatures for de-icing purposes whilst protecting the faces and upper body portions of the occupants of the motor car from direct impingement of uncomfortably hot air. In an arrangement described in more detail below, the upper mode flap 45 is arranged to direct all the air to the facia outlet 42 below a predetermined temperature in the outlet ducts 33, 34.

Referring now to the schematic graphs shown in FIG. 2, the lowest part of the graph shows the relationship between the position of the lower servo unit (71 FIG. 3), the position of a temperature flap 31 and the temperature in the outlet duct 33. The middle part of the graph shows the relationship between the position of the upper servo unit (70 FIG. 3), the position of a temperature flap 31 and the temperature in the outlet duct 34. As will be made clear in more detail below, the position of the servo unit and its respective temperature flap is set in accordance with the ambient temperature sensor and the respective in-car sensor(s) in accordance with the comparison of actual sensed temperature and the desired temperature selected by an occupant of the motor vehicle. The graph shows in broken lines the effect of ambient temperatures as well.

The relationship between the outlet duct temperature, the position of the temperature flap and the position of the servo unit is relatively uncomplicated, although simultaneous air flow quantity control of both upper and lower systems is complicated by the fact that fans common to both systems are provided.

However, as will be discussed in more detail below, this difficulty is substantially overcome by controlling the fan speed in dependence upon the additive requirements of the air in the outlet ducts 33 and 34.

Referring to the middle graph in FIG. 2, it will be seen that at maximum cooling demand a mixture of fresh and recirculated air is used, whereas at all other times the supply is all fresh air and therefore the flap valve 20 is suitably controlled to achieve this aim, as will be described in more detail below. The changeover point occurs at the upper servo mechanism "maximum cold" point.

Referring to the lower graph in FIG. 2 the "water tap shut/opens progressively" point, of course refers to the conventional engine cooling and air heating arrangement of a motor car in which the heater is located in a by-pass duct of the coolant path between the engine block and the coolant pump inlet connection, with a tap just upstream of the heater. In this preferred embodiment the water tap is mechanically interlinked with the lower servo unit.

Another feature of the graph that requires comment is the point on the middle graph referred to as the "upper mode point" which refers to the position of the upper mode flap 45. To the left of this point, as seen in FIG. 2, the flap 45 is in its full-line position in FIG. 1 in which all the air in the upper system is channelled through the outlet duct 42 to the faciaboard 12, while to the right of this point the flap 45 is in its borken-line position in which all the air is channelled through the outlet 41 to the windscreen 11. A further feature shown in the middle graph of FIG. 2 is the "lower quantity flap shut/open" point. This refers to the flap 35 in outlet duct 33 in FIG. 1 and is controlled such that when maximum and near maximum cooling is required by the upper system the lower quantity flap is closed.

Turning now to FIG. 3, there is shown a block diagram showing the controls of the air conditioning system of the present invention, including an electric circuit. As can be seen, the electric circuit is a negative earth circuit and there is a relay 50, having relay contacts 50a disposed in the air conditioning system supply circuit and a relay coil 50b. The supply circuit to the coil 50b is through control means 50c which are responsive to a signal Ep engine oil pressure switch and a signal Im from the engine starter motor circuit. These control means maintain the relay energised, and thus the air/conditioning system de-energised, at engine start up until the engine oil pressure has exceeded a certain predetemined value and starter motor circuit is de-energised. This enables operational noises from the system to be avoided before the engine is running.

The refrigerant compressor 62 is shown on the upper left portion of this block diagram and is provided with an electromagnetic clutch 51 adapted to be energised at ambient temperatures above freezing point by an electrical thermostat 52. The fan 24 and recirculation actuator 20a (located at the air intake chamber 15) are also schematically represented on the left-hand portion of the block diagram with the fresh recirculated air flap 20 (in FIG. 1) having two positions substantially corresponding to the conditions of fresh air only, and 100% recirculated air being circulated. At the right-hand side of this diagram a manually operable selector switch assembly 60 is shown as having contacts 53, 54a, 54b, 54c, and 55 respectively corresponding to "off", "low", "automatic", "high" and "de-ice". Both "low" and "high" are automatic positions but the fan speed is fixed at minimum for "low" and maximum for "high". "Automatic " has variable fan speed; all three fan characteristics are shown in FIG. 2.

The fan 24 is connected to a fan delay thermostat 63 via a fan speed control constituted by a transistor pack 64 to which further reference will be made below. The other side of the fan delay thermostat 63 is connected to the fan speed control and the fan delay thermostat 63 is effective in preventing cold air from being blown into the interior of the motor car when the selector switch 60 has been set to the "automatic" contact 54b and rheostats 78, 79 referred to below, have been set for heating, but the fan delay thermostat 63 will cut out when the water coolant of the engine has risen to a predetermined temperature. However, the fan delay thermostat 63 is also connected to an upper servo unit 70 which is effective in inhibiting operation of the fan delay thermostat 63 when the upper air system is operating to the left of the upper mode point in FIG. 2.

The fans are also inhibited by a Flash-mist Delay circuit 97 when the upper air system is operating to the right of the upper mode point in FIG. 2. When the system has been operating in the screen mode, and the fan delay thermostat has cut out due to the water coolant of the engine having risen above a predetermined temperature such that the fans are operating, if the engine of the car is switched off and then restarted at some time later when the water coolant is still above this predetermined temperature, the delay circuit 97 inhibits the operation of the fans for a predetermined period of time.

This is to prevent the humid air which will have collected in the ducting during the switch-off period from being blown over the windscreen and causing mistingup of the windscreen on restarting. The delay allows time for the evaporator to freeze the humidity out of the air before restarting the fans.

In addition to the upper servo unit 70 there is also a lower servo unit 71. The function of these servo units 70, 71 is to maintain automatically the temperature in the interior of the car at the selected temperatures, there being a servo unit for each of the two outlet ducts 33, 34.

The servo units 70 and 71 are connected to three modules, namely, an upper servo module 72, the already mentioned fan speed control 64 and a lower servo module 73. The upper and lower servo modules 72 and 73 are respectively connected to a series of thermistors 75, 76, and 77 for respectively measuring the "in-car" temperature, the ambient temperature and the temperature of the outlet ducts 33, 34. The upper and lower series of thermistors 75, 76, 77 are connected to the two rheostats 78 and 79 which are, respectively, the upper and lower temperature selectors. The junction between the rheostats 78 and 79 is connected to the autmoatic, low and high contacts 54a, 54b, 54c of the selector switch 60. The upper thermistor 75 (not the lower) has in parallel with it an additional thermistor 75 a located so as to be directly influenced by the rays of the sun, this latter thermistor being in series with a resistor. The object of this is to adjust the sensitivity of the upper in-car temperature sensing thermistor to compensate for the effects of sun heat. (Passengers do not need such a high air temperature when the heat from direct sunlight is present).

It will be noted that the ambient thermistors 76 have resistors connected in parallel to ensure control of the contribution of each to the overall effect.

The upper and lower servo modules 72 and 73 are substantially similar and basically comprise a balanced amplifier giving zero output to a respective servo motor 80, 81 within the servo unit 70, 71 respectively when the input potentials of the balanced amplifier are at a similar potential. The upper and lower series of themistors 75, 76, 77 are respectively connected to one of the inputs on the respective balanced amplifier, while feedback potentiometers 82, 83 in the servo units 70, 71, respectively, are respectively connected to the other input of the balanced amplifier. The servo motors 80, 81 act to increased or decrease the temperature and quantity of the air entering the motor car interior when the upper or lower "in-car" 75 indicate temperature different from the selected value. Thus movement of the servo motors 80, 81 adjusts the position of the relevant temperature flaps 31. In addition to the servo motors 80, 81, the servo units 70 and 71 also contain the feed-back potentiometers 82, 83 for the respective servo modules 72 and 73. The servo units 70, 71 also inlcude a pair of limiting means 85 and 86 for limiting the movement of the servo motors 80 and 81. The upper servo unit 70 is moreover provided with a mode position control 90 connected to the fan delay thermostat 63 for inhibiting the operation of that thermostat when the upper air system is operating to the left of the upper mode point, as already referred to.

The upper servo unit 70 also includes respective control 91 connected to control a lower quantity override actuator 96 in conjunction with lower quantity control box 96a. The upper mode flap actuator 45 is shown on the block diagram of FIg. 3 as being connected to a mode change thermostat 95 which is also connected to the upper servo module 72. This arrangement permits the upper mode flap to direct all the air to the dashboard outlets below a predetermined temperature, or alternatively the actuator may be switched from a predetermined position of the upper servo temperature flap Reference has been made previously to the fact that the system can divert its entire output to the upper air system at the extremes of hot and cold performance points, that is when the upper servo is to the left of the lower quantity flap operating point on FIG. 2 or when de-ice has been selected. This is achieved by the so-called "lower quantity flap override actuator " 96 which is actuated, at the hot end, when the selector switch 60 is positioned or set to selecting de-icing, and is automatically actuated, at the cold end, by the upper servo module 72. The lower quantity flap override actuator is also activated to the upper mode for automatic or de-ice positions of the selector switch if the coolant has not reached the predetermined. temperature of the fan delay thermostat. This is to avoid the introduction of cold "ram" air around the passengers' feet when starting up. This is achieved by a lower quantity control box 96a which is connected in circuit to receive signals from the fan delay thermostat 63 and the automatic and de-ice contacts 54 and 55 of the selector swich 60 and servo switch 91.

Referring now to the fan speed control 64, this contains the controls for steplessly varying the fan speed and moreover in such a way that the speed is controlled in dependence upon the additive requirements of the air in the outlet ducts 33 and 34. As can be seen, the fan speed control 64 is connected to respective fan speed controls 101 in the respective servo units 70 and 71. The fan speed controls 101 operate in such a way that when any adjustment of the temperature flaps takes place, there is a corresponding change in the fan motor speed. The two signals from fan speed controls 101 are processed within the fan speed control 64 to give a composite fan characteristic to produce the additive requirements of the two systems. The fan speed controls 101 are basically potentiometers the output signals of which are processed electronically to vary the mark/space ratio of the on/off pulse controlling fan speed transistor pack 64 which regulates the current flow to the fan motor and varies its speed by adjusting e.g. turning on and off, its supply for varying lengths of time.

What is claimed is:

1. A vehicle air-conditioning system for an internal combustion engine driven vehicle comprising:
    an air intake,
    a refrigerant evaporator connected to the output of said air intake for receiving the air passing into said air intake,
    first and second outlet ducting the separately conveying air to respective outlets in the upper and lower parts of the vehicle interior, respectively,
    first and second air mixing means respectively selectively connecting said first and second outlet ducting to said heater and said bypass conduit,
    means for automatically setting each of said air mixing means to feed to the respective outlet ducting air which has passed through the evaporator and through the heater and/or the heater bypass conduit,
    settable mass flow regulating means in at least one outlet ducting,
    air temperature sensing means for measuring the ambient temperature and the temperature inside the vehicle,
    means responsive to said sensed temperatures for automatically controlling the air mixing means and the mass flow regulating means,
    means for closing the outlet or outlets of the second outlet ducting and diverting the entire output of the system to said first outlet ducting,
    a manual means for varying the setting of said temperature sensing means, and
    control means responsive to engine oil pressure and the energization state of an engine starter motor circuit in said vehicle for maintaining the air-conditioning system deenergized until the oil pressure reaches a predetermined value and the starter motor circuit is deenergized after motor start up, said control means including a relay having contacts which are closed when said oil pressure reaches a predetermined value and after said starter motor circuit is deenergized, said contacts being connected at one end to a power supply and at the other end to said control means.

2. A system as claimed in claim 1, wherein the relay comprises a relay coil which is supplied through a circuit incorporating a control element responsive to a signal representative of engine oil pressure and to a signal indicative of the energization state of the engine starter motor.

3. A system as claimed in claim 2, wherein the control element operates to maintain the relay energised and supply circuit broken at vehicle engine start up until the engine oil pressure has exceeded a certain predetermined value and the starter motor circuit is de-energized.

4. A system as claimed in claim 1, wherein an electrically operable fan is provided between the outlet of the evaporator and the inlets of the heater and heater bypass conduit and fan control means are provided operative to control the fan speed in dependence upon the additive requirements of the air in the first and second outlet ductings.

5. A system as claimed in claim 4, wherein the supply circuit to the fan comprises transistorised control means and a fan delay thermostat, a servo unit is associated with the first outlet ducting and is operative to inhibit operation of the fan delay thermostat, a second servo unit is associated with the second outlet ducting and the first and second outlet ductings comprise first and second fan speed controls respectively responsive to the first and second air mixing means and operative to provide signals which are processed by the transistorised control means to produce a signal representative of the additive air requirements.

6. A system as claimed in claim 5, wherein the fan speed controls are potentiometers the processed signals from which are operative to vary the mark/space ratio of the on/off pulses controlling fan speed transistorised control means.

7. A system as claimed in claim 4, wherein under predetermined conditions at engine start up the means for shutting off the second outlet ducting assumes a closed position until the fan is switched on.

8. A system as claimed in claim 4, wherein a flash-mist delay circuit is provided operative to inhibit operation of the fan when humid air is present in the outlet ducting.

9. A system as claimed in claim 8, wherein the delay circuit produces a predetermined time delay.

* * * * *